March 14, 1944.  B. M. HYMAN  2,344,306
HUB EXTENSION FOR MOUNTING TRACTORS
Filed May 27, 1942
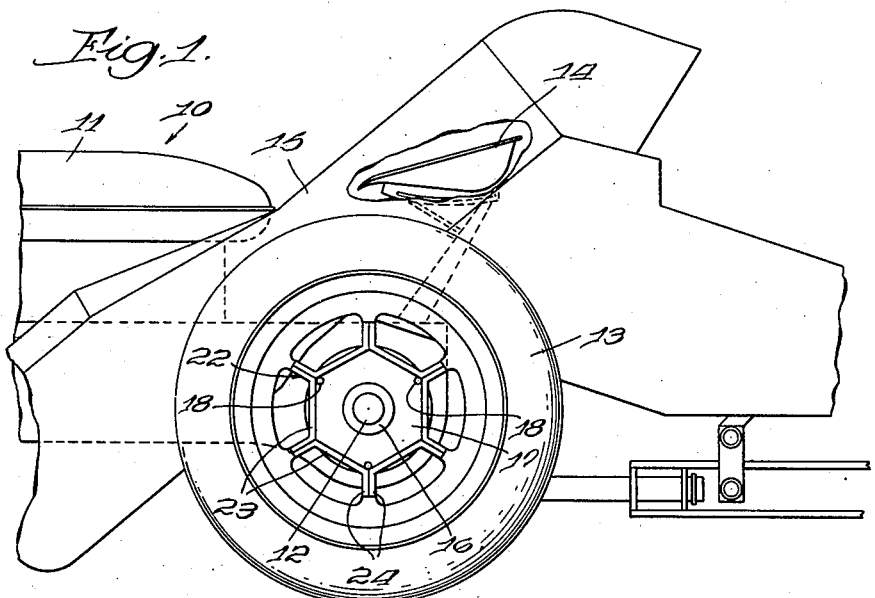
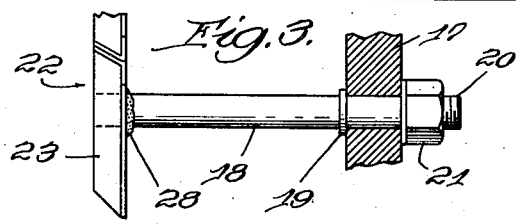
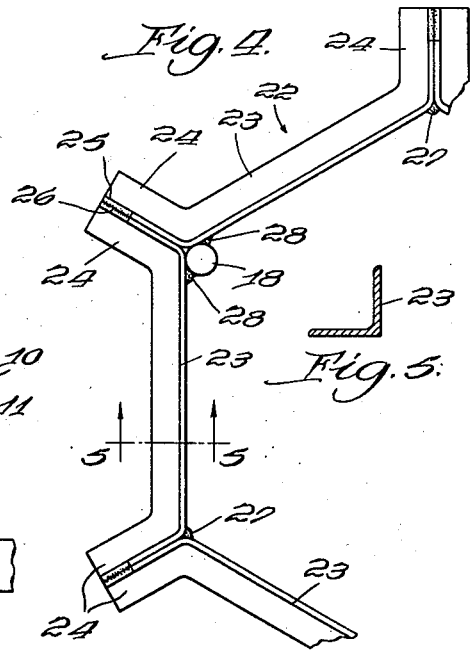
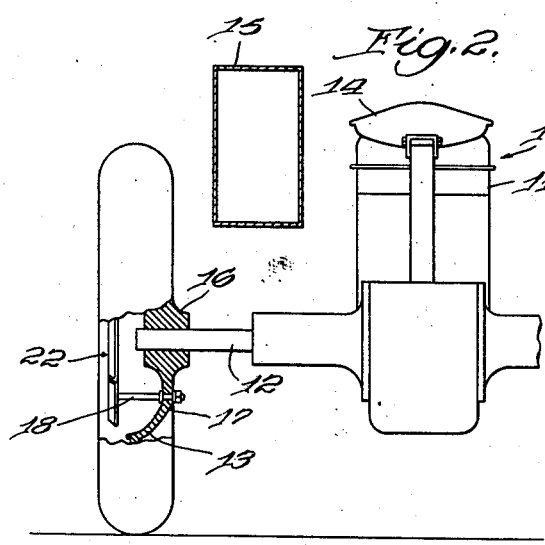
Inventor:
Benjamin M. Hyman
By Paul O. Pippel
Atty.

Patented Mar. 14, 1944

2,344,306

UNITED STATES PATENT OFFICE 2,344,306

HUB EXTENSION FOR MOUNTING TRACTORS

Benjamin M. Hyman, Moline, Ill., assignor to International Harvester Company, a corporation of New Jersey Application May 27, 1942, Serial No. 444,693

13 Claims. (Cl. 280—165)

This invention relates to means for mounting a tractor. More specifically it relates to a means for assisting an operator to mount a tractor upon which is mounted a corn picker.

It may be difficult for an operator to climb into the seat of a tractor upon which is mounted a harvester such as a corn picker comprising units extending over the rear axle of the tractor and parts extending between the units at the rear of the tractor, for the units extending over the rear axle make difficult access to the seat from the side, and the parts connecting the units at the rear of the tractor make difficult access to the seat from the rear.

An object of the present invention is the provision of an improved means for mounting a tractor.

A further object is to provide a means to enable an operator to climb into the seat of a tractor upon which is mounted a harvester.

Another object is the provision of means for assisting an operator to climb into the seat of a tractor upon which is mounted a corn picker composed of units extending across the axle of the tractor.

According to the present invention, a ring-like member is secured in spaced relation to the hub of a rear tractor wheel and thus provides a step for an operator to swing himself into the seat of the tractor over a harvester extending across the tractor rear axle.

In the drawing:

Figure 1 is a side view of a tractor with a corn picker mounted thereon and the novel mounting means of the present invention attached to a tractor wheel;

Figure 2 is a rear view of the tractor with parts removed and with a sectional showing of the corn picker mounted on the tractor, the section being a vertical one taken through the axle of the tractor and showing what the tractor operator must surmount in swinging himself from the novel mounting means attached to a tractor wheel into the tractor seat;

Figure 3 is a detail view showing a portion of what is shown in Figure 2, namely, a portion of the novel mounting means and its attachment to the tractor wheel;

Figure 4 is a side view of a portion of the novel mounting means; and

Figure 5 is a sectional view taken on the line 5—5 of Figure 4.

The reference character 10 designates a tractor having a narrow body 11, a rear axle 12, a rear wheel 13, and an operator's seat 14. A corn picker 15 extends over the rear axle 12 between the tractor body 11 and the rear wheel 13. This picker may be like the picker more fully shown in Patent No. 2,255,168, September 9, 1941, to Benjamin M. Hyman et al.

As seen in Figure 2, the wheel 13 includes a hub 16 secured to the axle 12 and a dished web portion 17 extending outwardly around the hub 16. Figure 1 shows three bolts 18 spaced equally from the hub 16 and from one another. These bolts are secured to web portion 17 adjacent the hub 16 as shown in Figure 3. Each bolt 18 has one end extending through the web portion 17, a shoulder 19 spaced from but adjacent the said one end, and a threaded portion 20 at the said one end. The shoulder 19 engages one side of the web portion 17 and cooperates with a nut 21 on the threaded portion 20 to hold the bolt against movement with respect to the wheel 13. Secured as by welding to the other end of the bolts 18 in spaced relation to the wheel 13 is a ring 22 formed of a plurality of pieces 23. Each piece 23 is formed of an angle iron having bent ends 24, one side of which is beveled as indicated at 25. The pieces 23 are six in number and are secured together to form a hexagon, being welded at the beveled portion 25 as indicated at 26 and at the alternate inside corners as indicated at 27. The bolts 18 are welded to the remaining alternate corners as indicated at 28. Thus the ring 22 is supported in spaced relation to the wheel 13 with its center coincident with the axes of the wheel 13 and the axle 12 and is in the form of a polygon, more specifically, a hexagon, having outwardly extending projections at the corners thereof formed of the bent ends 24.

The ring 22 enables an operator to mount into the seat 14. To do so, he places one foot on a top side of the hexagonal ring 22 and throws his other leg over the corn picker 15 and slides into the seat 14. The outwardly extending projections at the corners of the hexagonal ring 22 prevent the operator's foot from sliding off the ring. The sectional showing in Figure 2 of the corn picker 15 is taken at the axle 12 and thus represents what the operator must surmount in reaching the seat 14.

It will be apparent from the foregoing description that a new and novel means has been provided for mounting a tractor on which a harvester such as a corn picker is mounted.

In both the rear and side views of Figures 1 and 2, only one half of a tractor and a one-row corn picker have been shown. Presumably a picker will be mounted at each side of the tractor, for otherwise it would be unnecessary for the operator to climb over a picker in reaching the tractor seat. Also mechanism may well extend across the back of the tractor as shown in the aforementioned Hyman et al. patent, for this will render the novel mounting means of the present invention more indispensable, since it will be difficult to climb into the tractor seat from the back if mechanism extends across the back of the tractor. However, it is to be understood that the invention is not to be limited to these arrangements, but only within the scope of the appended claims.

What is claimed is:

1. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising an object having an outer periphery upon which an operator may step and which is of generally circular shape with outwardly extending projections spaced thereabout, and means fixing the object to the wheel in spaced relation to the outer side thereof with its center approximately coincident with the axis of the wheel.

2. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising an object having an outer periphery upon which the operator may step and which is formed of a plurality of straight sides with outwardly extending projections at the corners, and means fixing the object to the wheel in spaced relation to the outer side thereof with its center approximately coincident with the axis of the wheel.

3. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising an object having an outer periphery upon which the operator may step and which is formed as a regular polygon with outwardly extending projections at the corners thereof, and means fixing the object to the wheel in spaced relation to the outer side thereof with its center approximately coincident with the axis of the wheel.

4. In the combination specified in claim 2, the object being a ring.

5. In an assembly comprising a tractor having a body, an axle extending from one side thereof, a seat at the rear of the body generally over the axle, a wheel having a hub and being connected to the end of the axle by its hub in spaced relation to the said one side of the tractor body, and an implement positioned over the axle in the space between the tractor body and the wheel, the combination therewith of means for assisting an operator to climb over the implement into the seat, said means comprising a ring in the shape of a regular polygon having outwardly extending projections at the corner thereof and being formed of a plurality of flat pieces having bent ends, the pieces being welded end to end to form a regular polygon having outwardly extending projections at the corners, each projection being formed of contacting bent ends of a pair of adjacent pieces, and bolts welded to inner side of the corners of the polygon and attached to the wheel adjacent the hub thereof so as to secure the ring to the wheel in spaced relation to the outer side thereof.

6. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising a generally circular object upon the outer periphery of which the operator may step, and means fixing the object to the wheel with its axis coincident with the axis of the wheel and in spaced relation to the outer side thereof, the object being formed of a plurality of pieces having projections at the ends thereof and being secured one to the other in the form of a ring with each projection at one end of a piece contacting a projection of an adjacent piece so as to form an outwardly extending projection on the ring.

7. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising an object having an outer periphery upon which the operator may step and which is formed of a plurality of straight sides, and means fixing the object to the wheel in spaced relation to the outer side thereof with its center approximately coincident with the axis of the wheel, the object being formed of a plurality of straight pieces having projections at the ends thereof and being secured one to the other to form a polygon with each projection at one end of a piece contacting a projection of an adjacent piece so as to form an outwardly extending projection at a corner of the polygon.

8. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising a generally circular object upon the outer periphery of which the operator may step, and means fixing the object to the wheel, the object being formed of a plurality of pieces having projections at the ends thereof and being secured one to the other in the form of a ring with each projection at one end of a piece contacting a projection of an adjacent piece so as to form an outwardly extending projection on the ring.

9. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising an object having an outer periphery upon which the operator may step and which is formed of a plurality of straight sides, and means fixing the object to the wheel, the object being formed of a plurality of straight pieces having projections at the ends thereof and being secured one to the other to form a polygon with each projection at one end of a piece contacting a projection of an adjacent piece so as to form an outwardly extending projection at a corner of the polygon.

10. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising an object having an outer periphery upon which an operator may step and which is of generally circular shape with outwardly extending projections spaced thereabout, and means fixing the object to the wheel.

11. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising an object having an outer periphery upon which the operator may step and which is formed of a plurality of straight sides with outwardly extending projections at the corners, and means fixing the object to the wheel.

12. In the combination specified in claim 2, the object being a ring.

13. In an assembly comprising a tractor having a body, an axle extending from one side thereof, a seat at the rear of the body generally over the axle, a wheel at the end of the axle spaced from the said one side of the tractor body, and an implement positioned over the axle in the space between the tractor body and the wheel, the combination therewith of means for assisting an operator to climb over the implement into the seat, said means comprising an object having an outer periphery upon which the operator may step and which is formed as a regular polygon with outwardly extending projections at the corners thereof, and means fixing the object to the wheel.

BENJAMIN M. HYMAN.